(12) United States Patent
Brisset et al.

(10) Patent No.: US 8,025,576 B2
(45) Date of Patent: Sep. 27, 2011

(54) PRECISION BALL JOINT

(75) Inventors: Didier Brisset, Gradignan (FR); Gaël Paquignon, Grenoble (FR); Jean-Marie David, Villeneuve d'Ascq (FR); Gilles Diolez, Nimes (FR); Jean-Paul Perin, Seyssins (FR); Denis Chatain, S' Ismier (FR)

(73) Assignee: Commissariat a l'Energie Atomique (FR)

( * ) Notice: Subject to any disclaimer, the term of this patent is extended or adjusted under 35 U.S.C. 154(b) by 877 days.

(21) Appl. No.: 11/921,295

(22) PCT Filed: Jun. 9, 2006

(86) PCT No.: PCT/FR2006/050543
§ 371 (c)(1),
(2), (4) Date: Nov. 29, 2007

(87) PCT Pub. No.: WO2006/131684
PCT Pub. Date: Dec. 14, 2006

(65) Prior Publication Data
US 2009/0129855 A1    May 21, 2009

(30) Foreign Application Priority Data
Jun. 10, 2005 (FR) ...................................... 05 51573

(51) Int. Cl.
*F16D 3/42* (2006.01)

(52) U.S. Cl. .......................................... 464/125; 901/29
(58) Field of Classification Search .................. 464/118, 464/125; 901/28, 29; 403/122, 139, 144
See application file for complete search history.

(56) References Cited

U.S. PATENT DOCUMENTS

| 3,429,144 | A | * | 2/1969 | McIntosh ....................... 464/118 |
| 3,897,688 | A |   | 8/1975 | Meserol et al. |
| 4,906,123 | A | * | 3/1990 | Weskamp et al. ................ 901/28 |
| 5,554,537 | A |   | 9/1996 | Sharpe |
| 5,965,453 | A |   | 10/1999 | Skiffington et al. |
| 2004/0192447 | A1 | | 9/2004 | Fisher et al. |

FOREIGN PATENT DOCUMENTS

| EP | 1 122 452 A1 |   | 8/2001 |
| FR | 793629 | * | 1/1936 |
| FR | 947212 |   | 6/1949 |
| FR | 1049995 |   | 1/1954 |
| WO | WO96/09527 |   | 3/1996 |

* cited by examiner

*Primary Examiner* — Gregory Binda
(74) *Attorney, Agent, or Firm* — Baker & Hostetler LLP

(57) ABSTRACT

The joint comprises a ball (4) held between two seats (5 and 6) of the members (1, 2) to be joined, and it further comprises fittings (7, 8) bound to the members (1, 2) respectively, connected together through an intermediate jointed ring (12). A spring (13) maintains the contact between the ball and the seats. A rim (15) of the ring retains the ball (4) in case of disjunction. The ball (4) provides large accuracy in the position of the centre of rotation and the remainder of the joint maintains cohesion of the assembly.

10 Claims, 1 Drawing Sheet

PRECISION BALL JOINT

TECHNICAL FIELD

The subject of this invention is a precision ball joint joining two members in extension. It may be applied i.a. to a jointed robot arm. This joint is double or triple, i.e. it allows rotation of both members in all directions and possibly pivoting movements around their axes.

It is possible to build multiple joints in various ways, for example with trunnions with convergent axes of rotation or flexible tabs. But if very large accuracy of the position of the centre of rotation and a large angular travel of several tens of degrees are sought, these mechanisms are not suitable because of the plays of the trunnion bearings and of the rigidity which the tabs should retain.

So one resorts to another known family of joints comprising a spherical ball rotating on a concave seat in which it is adjusted, in order to form the invention. The centre of rotation is determined with very large accuracy for this kind of joints, even over a large angular travel. Further, the joint is resistant. A compressive force should however be exerted on the ball, in order to keep it in contact with both members and to avoid disjunction of the joint.

Documents FR-A-1 049 995 and FR-A-947 212 describe jointed systems especially used for achieving jamming at a selected angular position and which comprise a sphere attached to a rod, a fitting and a collar jointed together to a shaft, and a spherical cap depending on the fitting and which a spring pushes back against the sphere by attracting the collar against the latter. Jamming of the sphere is achieved between the collar and the spherical cap. A suitable convergent position adjustment between the rod attached to the sphere and another rod attached to the fitting cannot be obtained owing to uncertainties of attachment of the sphere on the rod and of position of the joint shaft relatively to the centre of the sphere, which depends on the actual dimensions of the jamming collar.

An essential object of the invention is to remove this difficulty in order to widen the field of application of such a ball joint, and notably to the linking of segments of a robot arm subject to unexpected compressive or tensile forces.

It relates to a joint joining two members in extension and comprising a ball placed between two concave seats provided on the members, characterized in that it comprises two convergent fittings placed on the members, a ring jointed to both fittings and surrounding the ball, and a return means placed between one of the fittings and one of the seats and pushing away this member towards the ball.

DETAILED DESCRIPTION OF THE INVENTION

Figure 1:
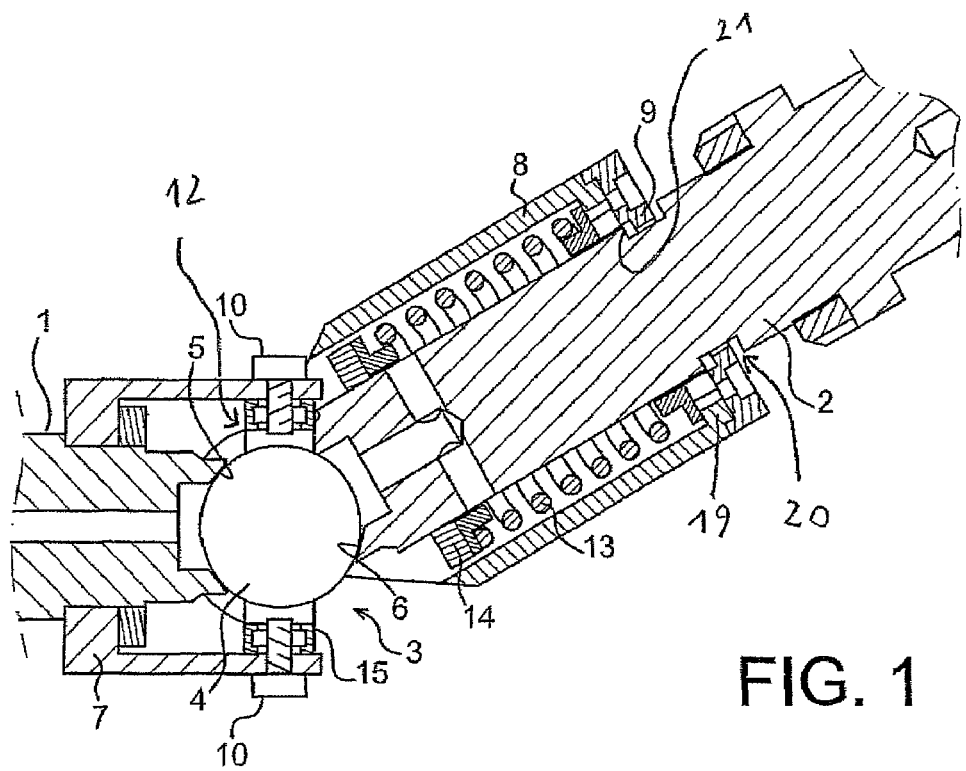
FIG. 1 is a schematic drawing in cross section of the precision ball joint of the present invention for joining two members in extension to the segments 1 and 2 which may represent segments of an otherwise conventional jointed robot arm (not shown)
Figure 2:
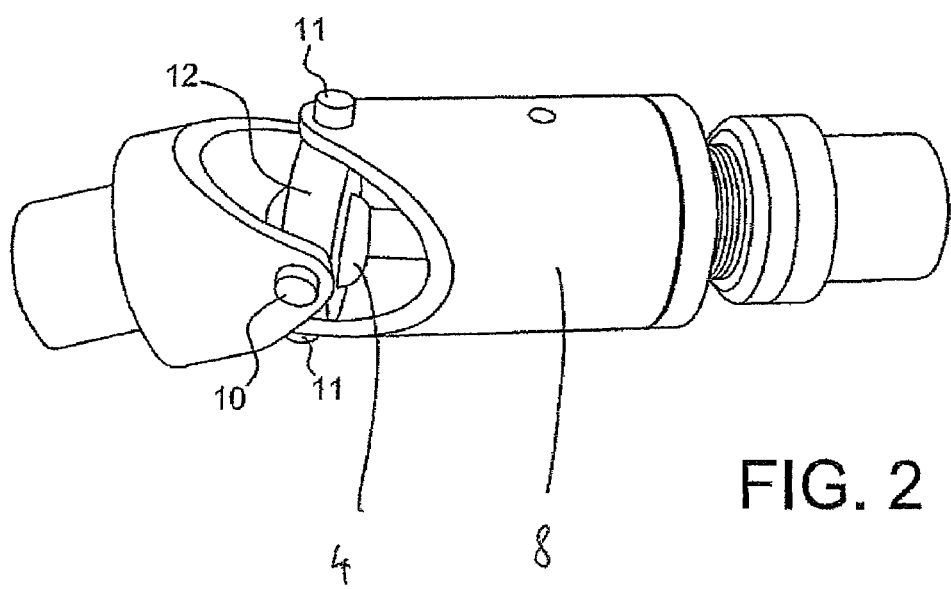
FIG. 2 is an enlarged perspective view of the joint of FIG. 1 with two shaft parts 10 and 11 shown interconnected to a ring 12 which encircles the ball 11.

The invention will now be described in connection with FIGS. 1 and 2, which illustrate the region of the joint as a sectional view and as an external view. The embodiment illustrated in FIGS. 1 and 2, comprises two successive segments 1 and 2 of a robot arm in extension and for which the angle may be adjusted by a circle of actuators (not shown) which join them together, and which are joined by a joint 3. The joint 3 is composite and comprises a ball 4, the sphericity of which is guaranteed to a large accuracy (this may be a rolling ball, which manufacturers know how to build with great quality) supported on circular seats 5 and 6, both circular and concave (here conical) at the respective ends of the segments 1 and 2. The joint 3 further comprises two fittings 7 and 8, respectively engaged around the ends of the segments 1 and 2. The fitting 7 is attached on the segment 1, and the fitting 8 has a region 19 as shown in FIG. 1 at the rear end thereof adjacent to the collar 9. The collar 9 engages into a groove 20 of the segment 2. This allows rotation of the fitting 8 by pivoting it relative to the segment 2.

The fittings 7 and 8 each comprise a pair of shaft parts 10 and 11 in extension. Further, the shaft of the part 10 crosses that of the part 11. A ring 12 is jointed to the shaft parts 10 and 11. The whole consisting of the fittings 7 and 8, of the parts 10 and 11 and of the ring 12, form a Cardan joint encircling the ball 4. The ball 4 remains free, i.e. it is not subject to any part and it would be free to fall if the segments 1 and 2 were moved apart from each other. The ring 12 is also separated from the ball 4, with a larger radius than that of the latter. A compression spring 13 is seated in the fitting 8 coaxially with the segment 2 and lies between the end region 19 of the fitting 8 which is located adjacent the collar 9 and a washer 14 which is attached to the segment 2. The compression in the spring 13 generates a pre-stress in the joint 3 by which the segment 2 is biased towards the ball 4. Bearings 15 provide the pivoting of the shaft parts 10 and 11.

The operation and the advantages of the joint 3 may be provided in this way. The position accuracy of the centre of rotation of the joint 3 is guaranteed by the seats 5 and 6 pressing onto the ball 4. The accuracy is very large over a large angular range if the ball 4 is directly supported on the conical seats 5 and 6, without any interposition of intermediate rolling components for example. The ring 12 jointed to the segments 1 and 2 also connects them but without any accuracy. The lack of any contact between the ring 12 and the ball 4 prevents any interference with the convergence of the axes of the segments 1 and 2 at the centre of the ball 4. Preloading the spring 13 pushes the segment 2 in a direction towards the segment 1 in order to maintain the contact of the ball 4 on the seats 5 and 6 as long as a rather large tensile force is not exerted on the segments 1 and 2. The abutment 21 of segment 2 keeps the collar 9 in its groove 20 when the segment 2 is moved, and continues to prevent luxation of the joint 3 by retaining the ball 4, which remains retained between the seats 5 and 6 and the ring 12 since it is not possible to move the segment 2 far away. Normal service of the joint 3 resumes as soon as the large tensile force ceases, the spring 13 bringing the segment 2 back into place and the seat 6 in abutment against the ball 4.

Excellent reliability of the joint 3 is thereby obtained, together with a large simplicity of structure. The centre of rotation of the joint 3 remains in a very small area, of the order of a radius of 1 micron. The joint 3 may withstand significant forces. The wear of the ball 4 does not reduce the quality of the joint since the spring 13 maintains the contact by bringing the seats 5 and 6 close to each other. No lubrication is necessary.

The invention claimed is:

1. A joint (3) for joining two members (1,2) with each member having an end forming a concave seat surface in opposed relationship to one another and with the joint comprising a ball (4) retained between the concave seat surfaces of the two members and further comprising fittings (7,8) surrounding each of the members with one of the fittings (7) being attached to a first one of the members and with the other fitting (8) comprising a housing, a compression spring extending within the housing in an arrangement for urging said second member towards the ball (4), with the fittings further comprising shaft parts (10, 11) and a ring (12) joining the shaft parts, such that the fittings, the shaft parts and ring form a Cardan joint surrounding the ball (4).

2. The joint according to claim 1, wherein each member is a segment of a robot arm.

3. The joint according to claim 2 characterized in that the joint is a joint of a jointed robot arm.

4. The joint according to claim 2 characterized in that the collar (9) forms-a pivoting link between said second member and said other fitting.

5. The joint according to claim 2 characterized in that the concave seats (5,6) are conical.

6. The joint according to claim 1, wherein the spring (13) is a compressed spring which extends in said housing in coaxial alignment with the second member and wherein said other fitting (8) further comprises a collar (9) residing in a groove of said second member and a washer attached to the second member for supporting the compression of the spring between the collar and washer.

7. The joint according to claim 6 characterized in that the concave seats (5,6) are conical.

8. The joint according to claim 6 characterized in that the ring is separated from the ball.

9. The joint according to claim 1, characterized in that the concave seats (5,6) are conical.

10. The joint according to claim 1 characterized in that the ring is separated from the ball.

* * * * *